(12) United States Patent
Araujo

(10) Patent No.: US 12,391,284 B2
(45) Date of Patent: Aug. 19, 2025

(54) SYSTEMS AND METHODS FOR PROVIDING FOR MANUAL DRIVING OF A VEHICLE WITH SELECTABLE TRANSITION BETWEEN A TWO-SEAT CONFIGURATION AND A FOUR-SEAT CONFIGURATION

(71) Applicant: GM GLOBAL TECHNOLOGY OPERATIONS LLC, Detroit, MI (US)

(72) Inventor: William Cavalcante Araujo, Claremont, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 131 days.

(21) Appl. No.: 18/520,266

(22) Filed: Nov. 27, 2023

(65) Prior Publication Data
US 2025/0171052 A1    May 29, 2025

(51) Int. Cl.
*B60W 60/00* (2020.01)
*B60K 35/231* (2024.01)
*B62D 1/183* (2006.01)

(52) U.S. Cl.
CPC ......... *B60W 60/005* (2020.02); *B60K 35/231* (2024.01); *B62D 1/183* (2013.01); *B60K 2360/685* (2024.01)

(58) Field of Classification Search
None
See application file for complete search history.

(56) References Cited

U.S. PATENT DOCUMENTS

| | | | |
|---|---|---|---|
| 10,427,705 B2 * | 10/2019 | Cao | B62D 5/04 |
| 11,124,219 B2 * | 9/2021 | Hansen | G05D 1/021 |
| 11,613,295 B1 * | 3/2023 | Harmon | B60K 35/22 |
| | | | 280/775 |
| 2018/0370559 A1 * | 12/2018 | Swamidason | B62D 1/181 |

* cited by examiner

*Primary Examiner* — James J Lee
*Assistant Examiner* — David Hatch
(74) *Attorney, Agent, or Firm* — Ingrassia Fisher & Lorenz, LLP

(57) ABSTRACT

Systems and methods for providing manual driving capabilities to an operator of a vehicle are provided. The systems include a screen within the vehicle configured to selectively transition between closed and open configurations by moving the screen and thereby cover or uncover, respectively, an opening to a compartment of the vehicle, a manual driving apparatus configured to selectively transition between concealed and exposed configurations by moving the manual driving apparatus to be disposed within the compartment or disposed at least partially outside of the compartment, respectively, and a controller configured to transition between autonomous and manual operating modes, wherein while in the autonomous operating mode an automated driving system is configured to perform driving tasks of the vehicle without human intervention, wherein while in the manual operating mode the vehicle is configured to perform the driving tasks based on human interaction with the manual driving apparatus.

19 Claims, 9 Drawing Sheets

SYSTEMS AND METHODS FOR PROVIDING FOR MANUAL DRIVING OF A VEHICLE WITH SELECTABLE TRANSITION BETWEEN A TWO-SEAT CONFIGURATION AND A FOUR-SEAT CONFIGURATION

INTRODUCTION

The technical field generally relates to vehicles, and more particularly relates to a vehicle having a manual driving apparatus that may be deployed during manual driving and stowed during autonomous driving.

The operation of modern vehicles is becoming more automated, that is, able to provide driving control with less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

For vehicles capable of high levels of automation (e.g., Four and Five), occupants may have little or no need for manual driving components, such as a steering wheel. In such instances, it may be desirable to omit the steering wheel to provide additional space within the vehicle cabin and thereby promote comfort of the occupants. However, some occupants may occasionally prefer manual driving, either in specific situations or simply for the pleasure of the driving experience.

Accordingly, it is desirable to provide system and methods that may promote comfort for vehicle occupants while also providing for manual driving capabilities when desired or needed. Furthermore, other desirable features and characteristics of the present disclosure will become apparent from the subsequent detailed description and the appended claims, taken in conjunction with the accompanying drawings and the foregoing introduction.

Summary

A system is provided for a vehicle. In one example, the system includes a screen within the vehicle configured to selectively transition between a closed configuration and an open configuration by moving the screen, wherein the screen covers an opening to a compartment of the vehicle while in the closed configuration and allows for access to the compartment via the opening while in the open configuration, a manual driving apparatus configured to selectively transition between a concealed configuration and an exposed configuration by moving the manual driving apparatus toward a rear of the vehicle, wherein the manual driving apparatus is disposed within the compartment while in the concealed configuration and disposed at least partially outside of the compartment when in the exposed configuration, and a controller configured to, one or more processors, transition the vehicle between an autonomous operating mode and a manual operating mode, wherein while in the autonomous operating mode the manual driving apparatus is in the concealed configuration and an automated driving system is configured to perform driving tasks of the vehicle without human intervention, wherein while in the manual operating mode the manual driving apparatus is in the exposed configuration and the vehicle is configured to perform at least some of the driving tasks based on human interaction with the manual driving apparatus.

In various examples, the manual driving apparatus of the system may include a steering wheel system, an accelerator pedal, and a brake pedal. In some examples, at least the steering wheel system may be configured to transition between a collapsed configuration and an expanded configuration when the manual driving apparatus is transitioned between the concealed configuration and the exposed configuration, wherein the manual driving apparatus occupies a reduced cubic volume while the steering wheel is in the collapsed configuration relative to the expanded configuration.

In various examples, the system may include a carriage supporting the manual driving apparatus, a track on which the carriage is configured to slide into and from the compartment between a front and a rear of the vehicle.

In various examples, the system may include an instrument panel secured to a floor of the vehicle that is configured to display information indicative of the operation of the vehicle and may include an instrument panel located on a center console of the vehicle.

In various examples, the screen may cover an area of the vehicle extending from a first side of the vehicle to a second side of the vehicle and extending from a floor of the vehicle to a base of a windshield of the vehicle.

In various examples, the system may include a seat arrangement within the vehicle configured to selectively transition between a two-seat configuration and a four-seat configuration by sliding one or more front seats in directions between a front and a rear of the vehicle and one or more rear seats configured to deploy to occupy space provided while the one or more front seats are disposed toward the front of the vehicle. The controller may be configured to, by the one or more processors, determine a position of the manual driving apparatus in the exposed configuration based on the seat arrangement when transitioning the vehicle to the manual operating mode.

In various examples, the screen of the system may be configured to transition into the closed configuration while the manual driving apparatus is in the exposed configuration.

A method is provided for selectively providing manual driving capabilities to an operator of a vehicle. In one example, the method includes transitioning a screen within the vehicle from a closed configuration to an open configuration by moving the screen to uncover an opening to a compartment of the vehicle and provide access to the compartment via the opening, transitioning a manual driving apparatus of the vehicle from a concealed configuration to an exposed configuration by moving the manual driving apparatus toward a rear of the vehicle from within the compartment to at least partially outside of the compartment, and transitioning the vehicle from an autonomous operating mode wherein an automated driving system performs driving tasks of the vehicle without human intervention to a manual operating mode wherein at least some of the driving tasks are performed based on human interaction with the manual driving apparatus.

In various examples, the manual driving apparatus may include a steering wheel system, an accelerator pedal, and a brake pedal, and the method may include performing at least some of the driving tasks using the steering wheel system, the accelerator pedal, and the brake pedal while the vehicle is in the manual operating mode. In some examples, the method may include transitioning at least the steering wheel system from a collapsed configuration to an expanded configuration while transitioning the manual driving apparatus from the concealed configuration to the exposed configuration, wherein the manual driving apparatus occupies a reduced cubic volume while the steering wheel system is in the collapsed configuration relative to the expanded configuration.

In various examples, the method may include transitioning the manual driving apparatus from the concealed configuration to the exposed configuration includes sliding a carriage supporting the manual driving apparatus on a track from the compartment toward a rear of the vehicle.

In various examples, the method may include displaying information indicative of the operation of the vehicle on an instrument panel secured to a floor of the vehicle.

In various examples, the method may include interacting with an instrument panel located on a center console of the vehicle.

In various examples, the method may include, prior to transitioning the manual driving apparatus from the concealed configuration to the exposed configuration, transitioning a seat arrangement within the vehicle from a two-seat configuration to a four-seat configuration by sliding one or more front seats in a direction toward a front of the vehicle and deploying one or more rear seats to occupy space provided by sliding the one or more front seats, receiving, by the controller, an operator initiated command to transition to the manual operating mode, and determining, by the controller, a position of the manual driving apparatus in the exposed configuration based on the seat arrangement.

In various examples, the method may include covering the opening of the compartment while the manual driving apparatus in the exposed configuration by transitioning the screen from the open configuration to the closed configuration.

A vehicle is provided that, in one example, includes a screen within the vehicle configured to selectively transition between a closed configuration and an open configuration by moving the screen, wherein the screen covers an opening to a compartment of the vehicle while in the closed configuration and allows for access to the compartment via the opening while in the open configuration, a manual driving apparatus configured to selectively transition between a concealed configuration and an exposed configuration by moving the manual driving apparatus toward a rear of the vehicle, wherein the manual driving apparatus is disposed within the compartment while in the concealed configuration and disposed at least partially outside of the compartment when in the exposed configuration, and a controller configured to, one or more processors, transition the vehicle between an autonomous operating mode and a manual operating mode, wherein while in the autonomous operating mode the manual driving apparatus is in the concealed configuration and an automated driving system is configured to perform driving tasks of the vehicle without human intervention, wherein while in the manual operating mode the manual driving apparatus is in the exposed configuration the vehicle is configured to perform at least some of the driving tasks based on human interaction with the manual driving apparatus.

In various examples, the manual driving apparatus of the vehicle may include a steering wheel system, an accelerator pedal, and a brake pedal, wherein at least the steering wheel system is configured to transition between a collapsed configuration and an expanded configuration when the manual driving apparatus is transitioned between the concealed configuration and the exposed configuration, wherein the manual driving apparatus occupies a reduced cubic volume while the steering wheel system is in the collapsed configuration relative to the expanded configuration.

In various examples, the vehicle may include a carriage supporting the manual driving apparatus, a track on which the carriage is configured to slide into and from the compartment between a front and a rear of the vehicle.

In various examples, the vehicle may include a seat arrangement within the vehicle configured to selectively transition between a two-seat configuration and a four-seat configuration by sliding one or more front seats in directions between a front and a rear of the vehicle and one or more rear seats configured to deploy to occupy space provided while the one or more front seats are disposed toward the front of the vehicle. The controller may be configured to, by the one or more processors, determine a position of the manual driving apparatus in the exposed configuration based on the seat arrangement when transitioning the vehicle to the manual operating mode.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction summary or the following detailed description.

For the sake of brevity, conventional techniques related to signal processing, data transmission, signaling, control, and other functional aspects of the systems (and the individual operating components of the systems) may not be described in detail herein.

Furthermore, the connecting lines shown in the various figures contained herein are intended to represent example functional relationships and/or physical couplings between the various elements. It should be noted that many alternative or additional functional relationships or physical connections may be present in some examples.

Figure 1:
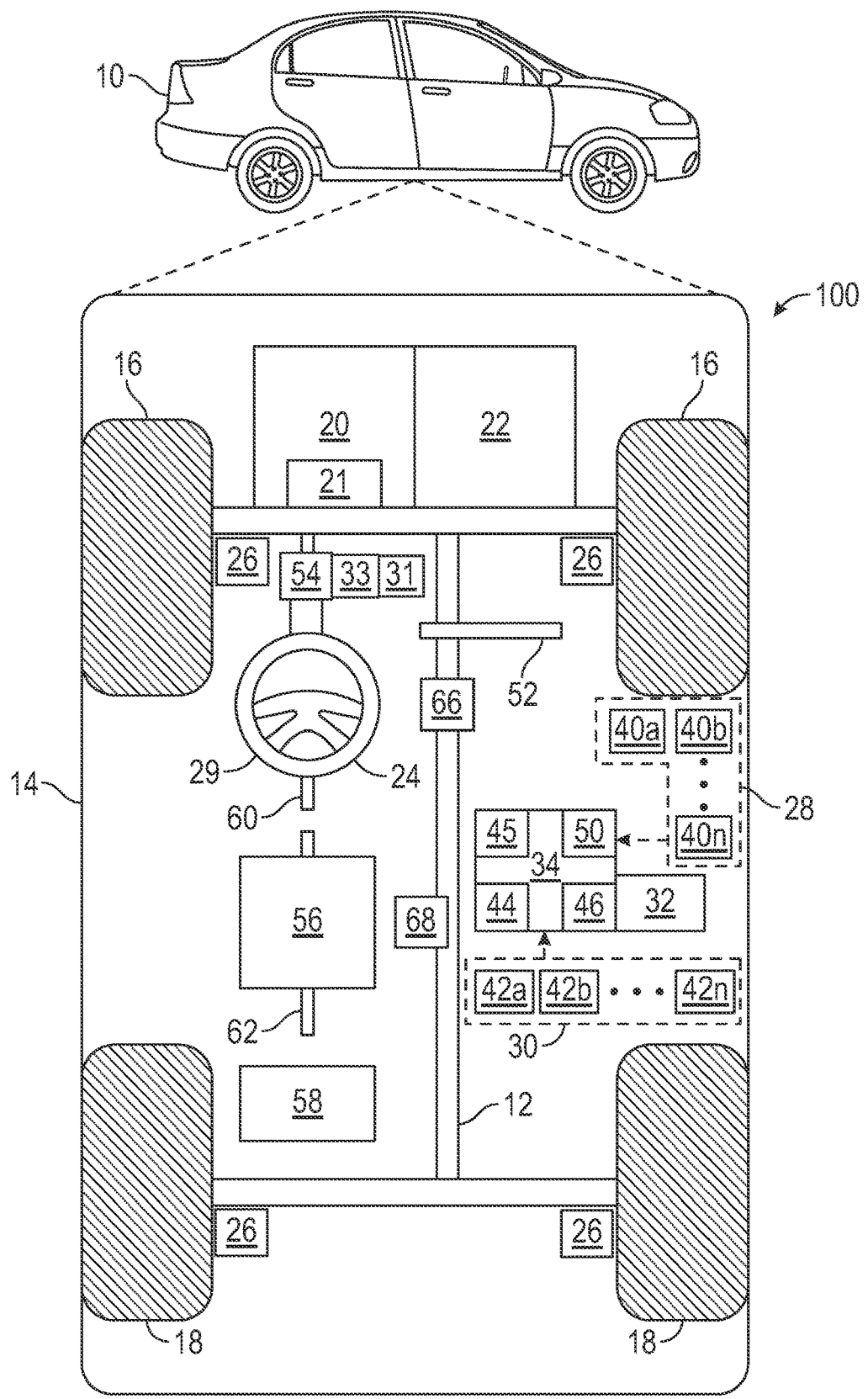
FIG. 1 is a functional block diagram of a vehicle that includes a deployable, manual driving apparatus in accordance with an example.

FIG. 1 illustrates a vehicle 10 that includes an exemplary vehicle driving system 100. In certain examples, the vehicle 10 includes an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In other examples, the vehicle 10 may be various other types of vehicles or mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a manual driving apparatus 24, a sensor system 28, an actuator system 30, at least one data storage device 32, at least one controller 34, at least one front seat 56, and, optionally, one or more rear seats 58. The propulsion system 20 includes an engine and/or motor 21, such as internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n may include, but are not limited to, current sensors, voltage sensors, temperature sensors, motor speed sensors, position sensors, etc.

The actuator system 30 includes one or more actuator devices 42a-42n that control one or more vehicle features such as, but not limited to, the propulsion system 20, the transmission system 22, and/or the manual driving apparatus 24.

The data storage device 32 stores data for use in controlling the vehicle 10 and/or systems and components thereof. As may be appreciated, the data storage device 32 may be part of the controller 34, separate from the controller 34, or part of the controller 34 and part of a separate system. The storage device 32 may be any suitable type of storage apparatus, including various different types of direct access storage and/or other memory devices. In one exemplary embodiment, the storage device 32 comprises a program product from which a computer readable memory device may receive a program that executes one or more embodiments of one or more processes of the present disclosure, such as the steps of the process discussed further below in connection with FIG. 11. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 may be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 may be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate data.

As may be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

In various examples, the controller 34 may include an automated driving system (ADS) 50 for automatically controlling various actuator devices (e.g., one or more of the actuator devices 42a-42n) in the vehicle 10. In one example, the ADS 50 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that may be managed by a human driver. In an example, the ADS 50 is configured to control the propulsion system 20, the transmission system 22, a steering system, and wheel brakes 26 to control vehicle acceleration, steering, and braking, respectively, without human intervention via a plurality of actuator devices in response to inputs from a plurality of sensors (e.g., one or more of the sensing devices 40a-40n), which may include GPS, RADAR, LIDAR, optical cameras, thermal cameras, ultrasonic sensors, and/or additional sensors as appropriate.

In various examples, the vehicle 10 (e.g., the controller 34) may be configured to selectively operate in an autonomous operating mode or in a manual operating mode. In the autonomous operating mode, the vehicle 10 may operate with the ADS 50 performing all or a majority of the driving tasks (e.g., steering, acceleration, braking, etc.). In the manual operating mode, various driving tasks may be entirely, primarily, or partially provided by a human driver and the ADS 50 may or may not provide driving assistance. Although the vehicle 10 is described for convenience as including a single autonomous operating mode a single manual operating mode, the vehicle 10 may instead have more than one manual operating mode wherein each of the manual driving modes includes different levels of driving task assistance from the ADS 50 (e.g., Level Three, Level Two, Level One, or Level Zero automation). Likewise, the vehicle 10 may include more than one autonomous operating mode wherein each of the autonomous operating modes includes different levels of driving task performance (e.g., Level Five or Level Four).

The manual driving apparatus 24 includes various components configured for manually performing certain driving tasks for the vehicle 10. In some examples, the manual driving apparatus 24 includes a steering wheel 29 configured to influence a position of the wheels 16-18 for steering the vehicle 10, an accelerator pedal 31 configured to accelerate the vehicle 10, and a brake pedal 33 configured to influence operation of wheel brakes 26. The steering wheel 29, the accelerator pedal 31, and the brake pedal 33 are secured to a carriage 54 that is configured to transition along a track 60 in directions between the front and the rear of the vehicle 10. The steering wheel 29 may be a component of a steering wheel system that further includes one or more operator interface mechanisms or controls, such as components configured to operate turn signals, exterior lighting, windshield wipers, etc. In addition, the manual driving apparatus 24 and/or the steering wheel system may include air bag system.

In various examples, the manual driving apparatus 24 is configured to be stowed in a compartment while the vehicle 10 is operating in the autonomous driving mode and to be deployed and accessible to a driver when the vehicle 10 is operating in the manual driving mode. FIGS. 2-6 illustrate various stages of deployment of the manual driving apparatus 24 in accordance with one nonlimiting example.

Figure 2:
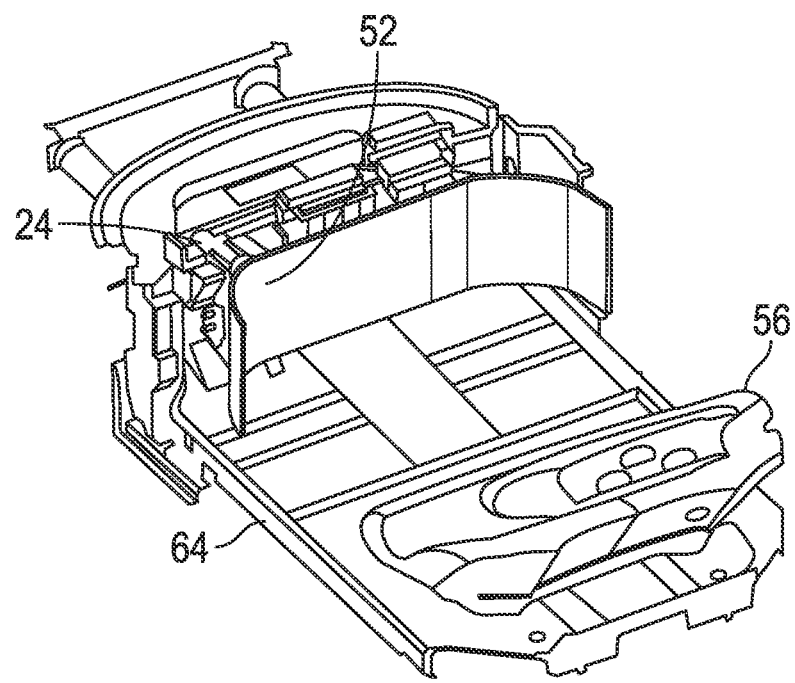
FIGS. 2, 3, 4, 5, and 6 are partial perspective view illustrating certain aspects of the operation of the manual driving apparatus of FIG. 1 in accordance with an example.
Figure 3:
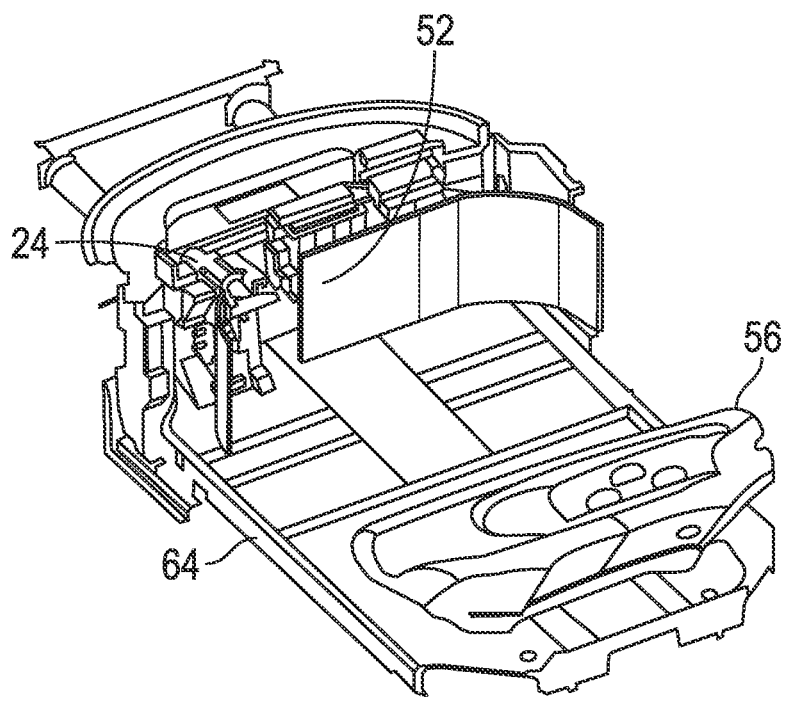
Figure 4:
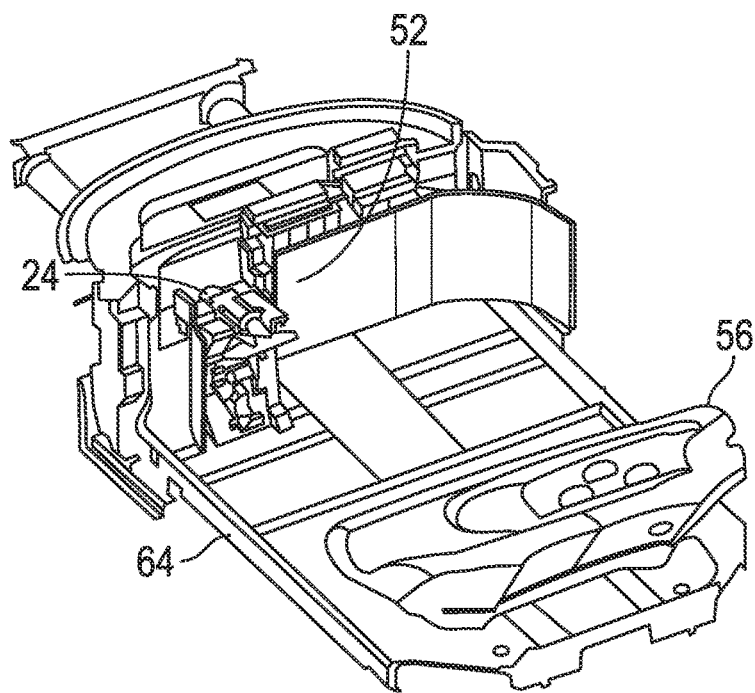
Figure 5:
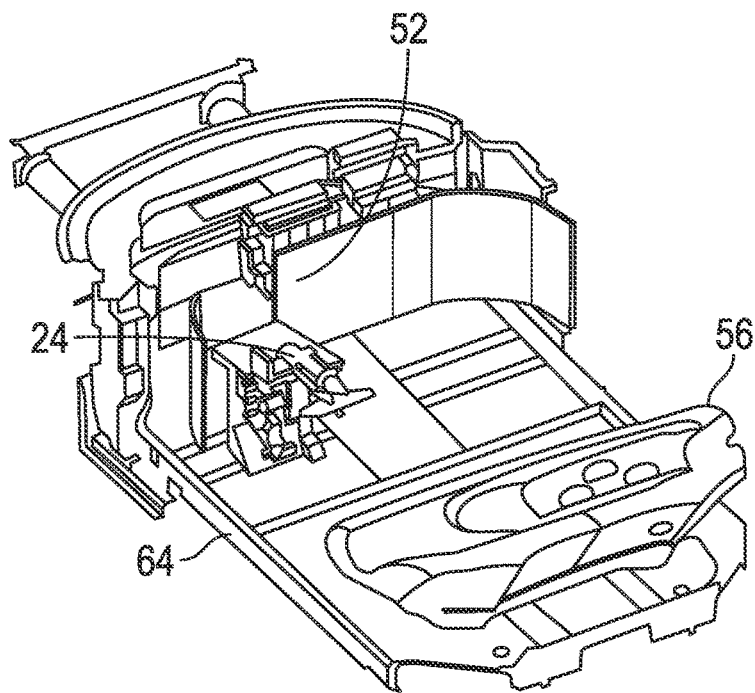

In FIG. 2, the vehicle 10 is operating in the autonomous driving mode, the ADS 50 is performing all or a majority of the driving tasks, the manual driving apparatus 24 is disposed within a compartment of the vehicle 10, and the compartment is covered with a panel or screen 52. Further, while in the autonomous operating mode, one or more of the components of the manual driving apparatus 24 may be inactive, that is, the steering wheel 29, the accelerator pedal 31, and the brake pedal 33 do not function and/or do not influence the driving tasks of the vehicle 10.

To transition from the autonomous driving mode to the manual driving mode, the screen 52 may transition from a closed configuration (FIG. 2.) to an open configuration (FIG. 3) thereby uncovering an opening to the compartment and allowing for access thereto. Various methods and systems may be used to move the screen 52. In some examples, the screen 52 may be configured to roll or slide along a track (not shown). In some examples, the screen 52 is configured to roll up into a cylindrical roll. In various examples, the screen 52 covers an area of the vehicle 10 extending entirely or substantially entirely from a first side of the vehicle 10 to a second side of the vehicle 10 (e.g., pillar-to-pillar) and extending entirely or substantially entirely from a floor of the vehicle 10 to a base (e.g., lowermost extent) of a windshield of the vehicle 10 (e.g., floor-to-windshield). In various examples, the screen 52 substantially planar. In various examples, the screen 52 may curved.

Once the screen 52 is in the open configuration, the manual driving apparatus 24 may transition from a concealed configuration (FIGS. 2 and 3) to an exposed configuration (FIGS. 4-6), wherein the manual driving apparatus 24 is at least partially outside of the compartment when in the exposed configuration. Various methods and systems may be used to move the manual driving apparatus 24. In various examples, the carriage 54 is configured to move along the track 60 from within the compartment to outside or at least partially outside of the compartment.

Figure 6:
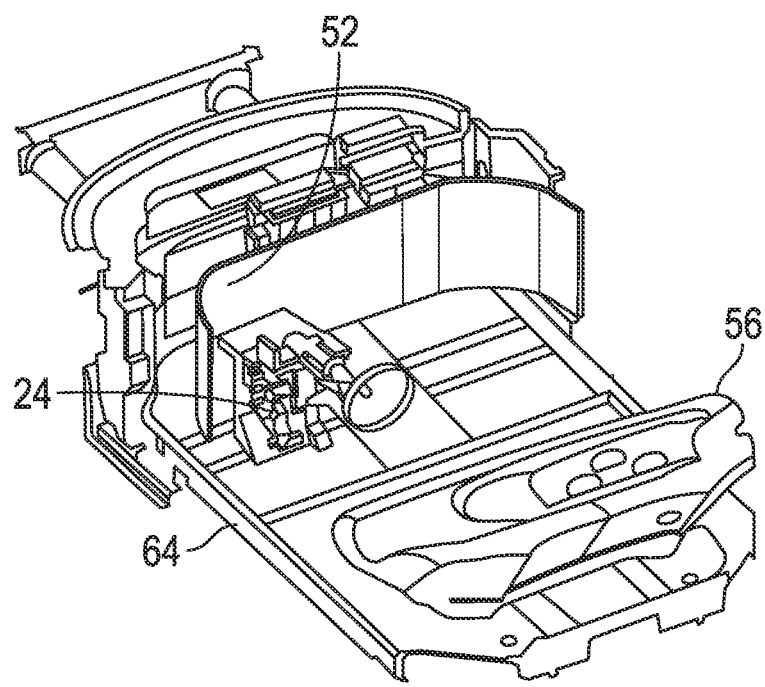

After the manual driving apparatus 24 is in the exposed configuration, the screen 52 or another panel or screen may optionally cover the opening to the compartment. For example, FIG. 6 illustrates the screen 52 in the closed configuration and covering the opening to the compartment.

While in the exposed configuration, one or more of the components of the manual driving apparatus 24 are active, that is, the steering wheel 29, the accelerator pedal 31, and the brake pedal 33 are operable to influence the driving tasks of the vehicle 10, the vehicle 10 may transition from the autonomous operating mode to the manual operating mode, and some or all of the driving tasks may be performed by the driver.

Figure 7:
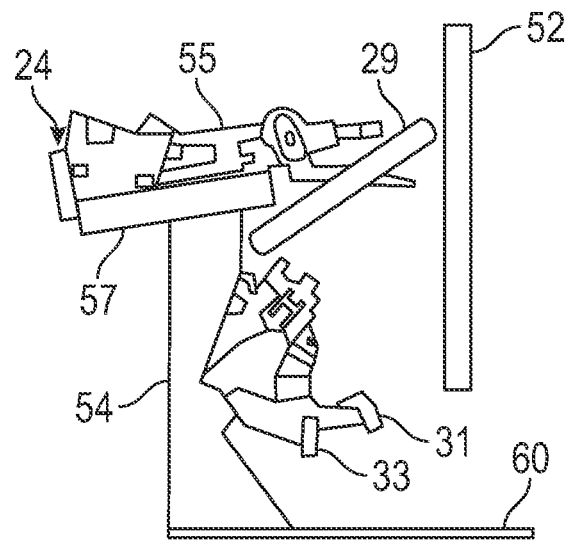
FIGS. 7 and 8 are isolated side view of the manual driving apparatus in collapsed and expanded configurations, respectively, in accordance with an example.
Figure 8:
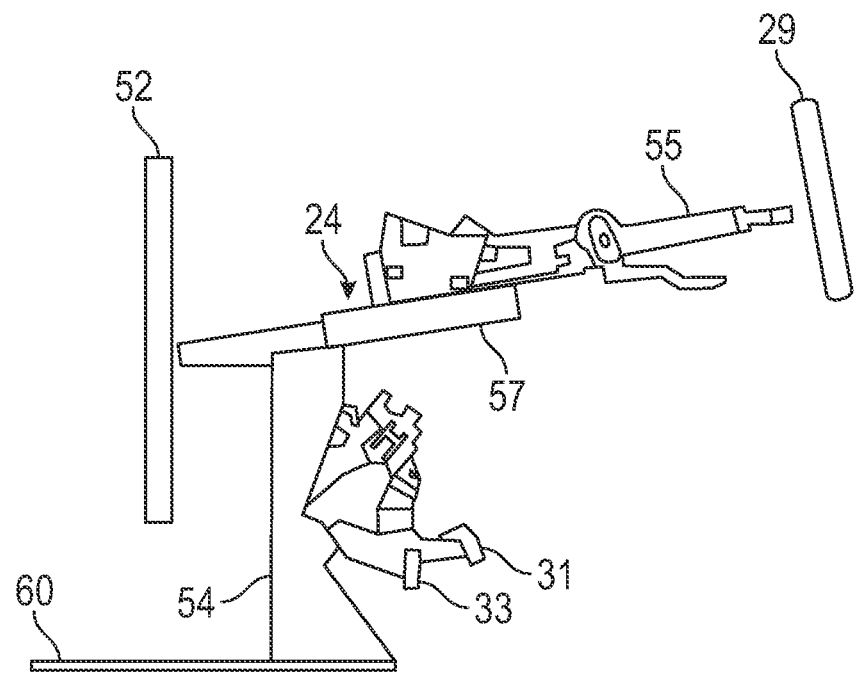

In various examples, one or more components of the manual driving apparatus 24 may be configured to move and/or collapse while transitioning between the concealed configuration and the exposed configuration. For example, FIGS. 7 and 8 present side views of the manual driving apparatus 24 in the concealed configuration and the exposed configuration, respectively, in accordance with a nonlimiting example. In FIG. 7, the steering wheel 29, a steering column 55, and a portion 57 of the carriage 54 are in retracted or collapsed configurations such that the manual driving apparatus 24 occupies a reduced cubic volume (or linear dimension between the front and rear of the vehicle 10) and allows for stowing the manual driving apparatus 24 in a smaller sized compartment than would otherwise be possible. In FIG. 8, the steering wheel 29, the steering column 55, and the portion 57 of the carriage 54 are in expanded configurations to provide proper positioning of the steering wheel 29 for the driver. Specifically, the steering column 55 and the portion 57 move relative to the remainder of the carriage 54 to extend the steering wheel 29 in a direction toward the rear of the vehicle 10, and the steering wheel 29 pivots upwards into an operational position.

Figure 9:
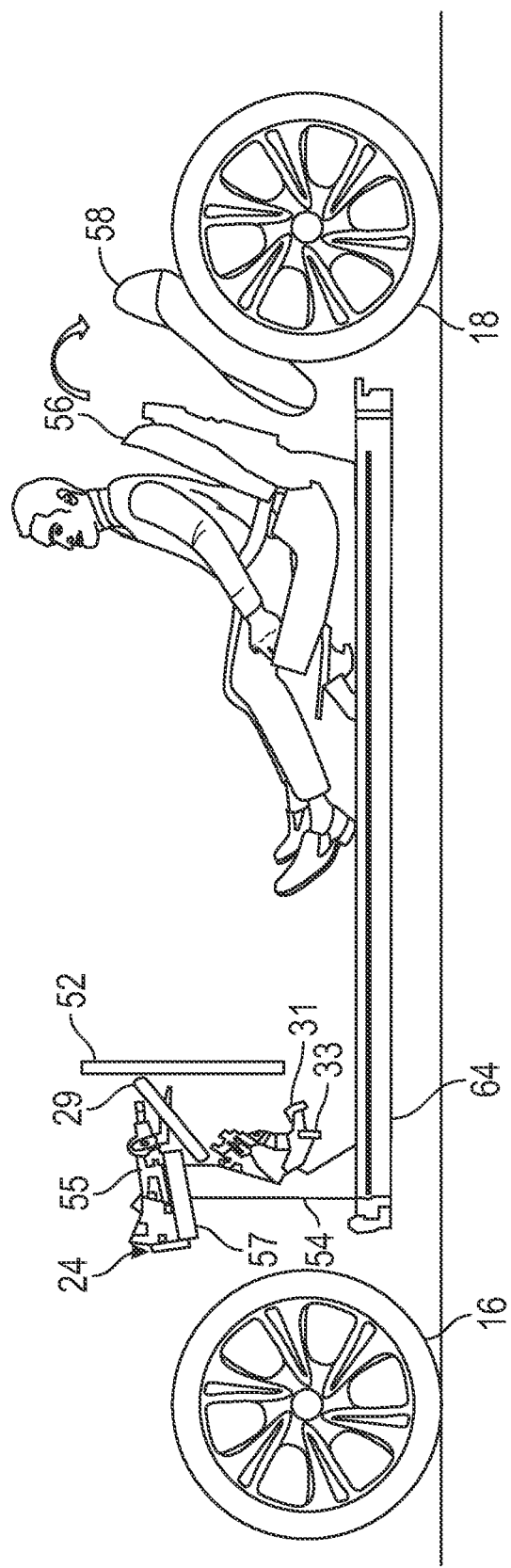
FIGS. 9, 10, and 11 are partial side views of the vehicle of FIG. 1 illustrating seating arrangements in accordance with an example.
Figure 10:
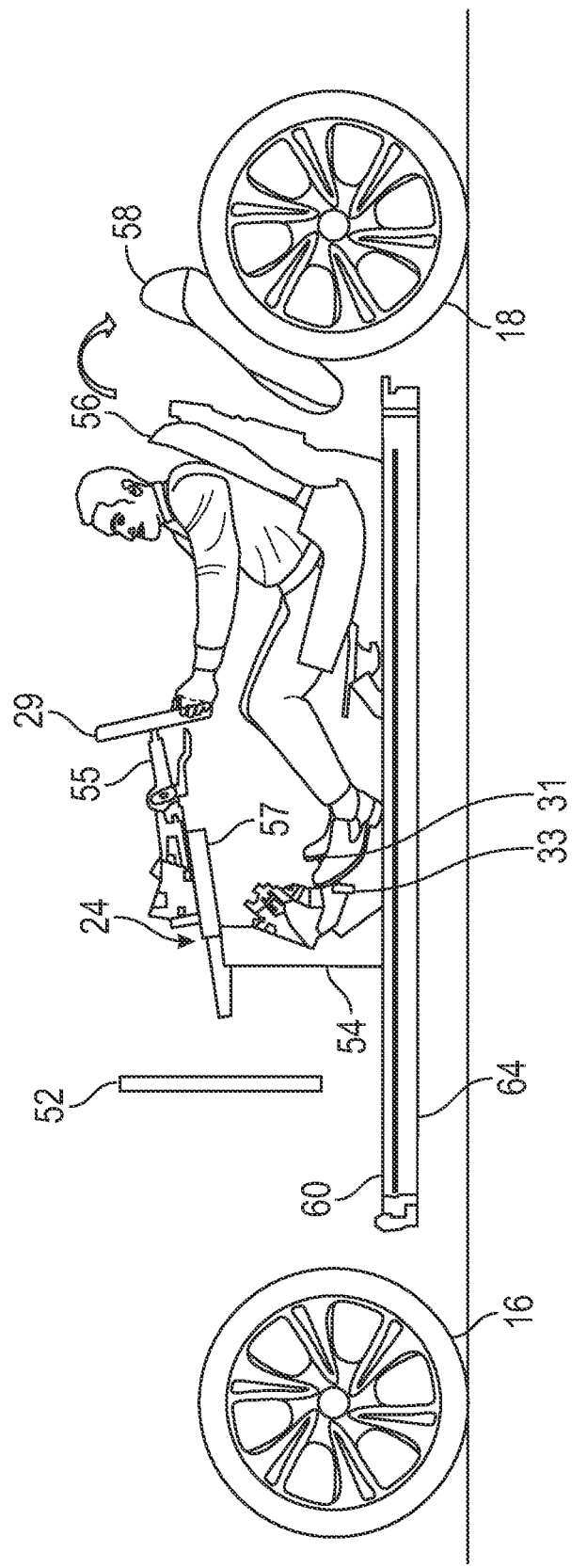
Figure 11:
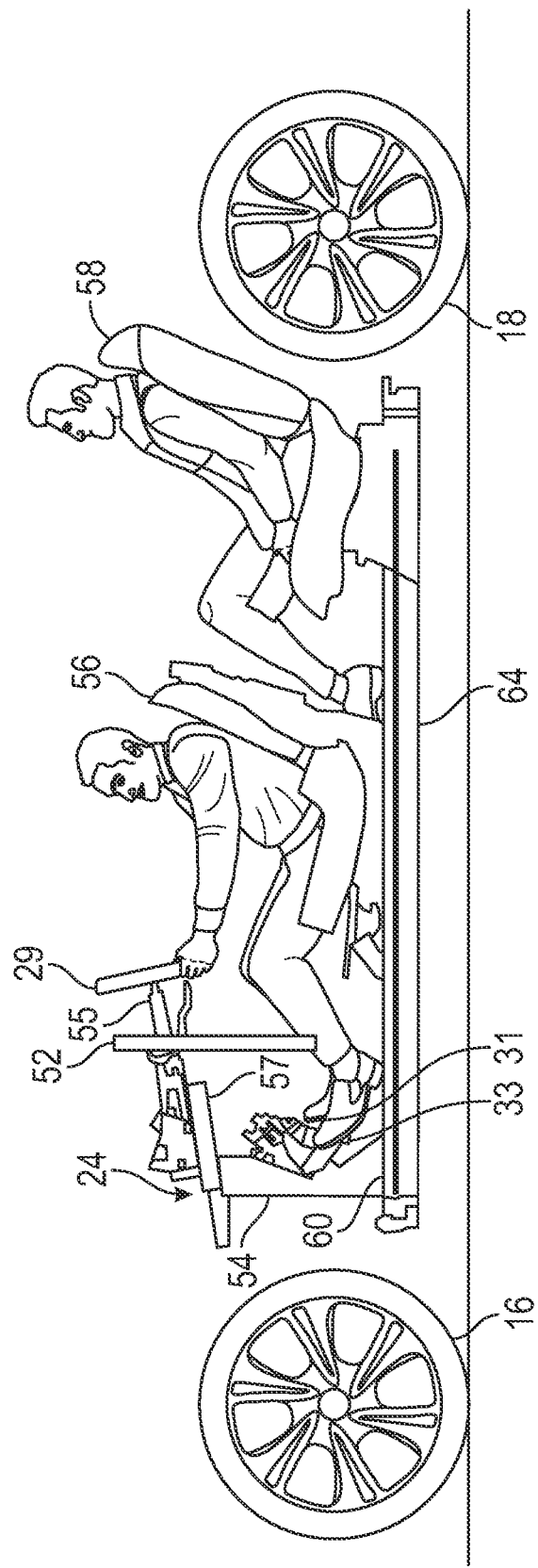

The position of the steering wheel 29, the accelerator pedal 31, and the brake pedal 33 while in the exposed configuration may vary and, in some examples, may be based on saved or sensed parameters such as driver preference, driver height, seat configuration, etc. For example, FIGS. 9 and 10 illustrate a first seat configuration (e.g., two-seat configuration) and FIG. 11 illustrates a second seat configuration (e.g., four-seat configuration). In FIGS. 9 and 10, the front seat 56 is disposed toward the rear of the vehicle 10, and in FIG. 11, the front seat 56 is disposed toward the front of the vehicle 10 with a rear seat 58 is disposed toward the rear of the vehicle 10. In FIG. 9, the vehicle 10 is operating in the autonomous operating mode, and the manual driving apparatus 24 is in the concealed configuration within the compartment and covered by the screen 52. In FIGS. 10 and 11, the vehicle 10 is operating in the manual operating mode, and the manual driving apparatus 24 is in the exposed configuration and thereby accessible by the driver. Notably, the manual driving apparatus 24 positions the steering wheel 29, the accelerator pedal 31, and the brake pedal 33 in different positions depending on the position of the front seat 56. In the first configuration and the second configuration, the positions of the steering wheel 29, the accelerator pedal 31, and the brake pedal 33 may be defined at least in part by a dimension measured between a centerline of the front wheels 16 and a ball of the driver's foot while on the accelerator pedal 31. In this first seat configuration, this dimension has a greater value (e.g., L113) than in the second configuration (e.g., L113').

In some examples, the vehicle 10 is configured to transition between the first and second configurations and/or various positions therebetween. For example, the front seat 56 may be configured to selectively move between the first and second configurations by sliding in directions between a front and a rear of the vehicle 10 along a track 62. Movement of the front seat 56 may be performed manually and/or motorized by manual control and/or autonomous control. In some examples, the rear seat 58 may be configured to transition between a stowed configuration (FIGS. 9 and 10) and a deployed configuration (FIG. 11), for example, by pivoting a base cushion of the seat upwards or downwards, respectively. In various examples, the controller 34 may be configured to determine the seat arrangement, the individual seat positions, and/or the position of the occupant, determine a position of the manual driving apparatus 24 while in the exposed position that provides proper, desired, and/or ergonomic positioning relative to the occupant, and, when transitioning the manual driving apparatus 24 to the exposed configuration, move the manual driving apparatus 24 to the determined position.

In various examples, the vehicle 10 may include at least a first instrument panel 66 configured to display visual elements indicative of the operation of the vehicle 10 on a display screen, provide an interactive graphic user interface, and/or provide one or more mechanisms (e.g., one or more knobs or buttons) for influencing features of the vehicle 10. Is some examples, the first instrument panel 66 may be secured to the floor 64 of the vehicle 10, for example, on a pedestal, rather than to a dash or other area that may interfere with the movement of the screen 52. In various examples, the vehicle 10 may include at least a second instrument panel 68 configured to display visual elements indicative of the operation of the vehicle 10 on a display screen, provide an interactive graphic user interface, and/or provide one or more mechanisms (e.g., one or more knobs or buttons) for influencing features of the vehicle 10. Is some examples, the second instrument panel 68 may be secured on a center console of the vehicle 10.

Figure 12:
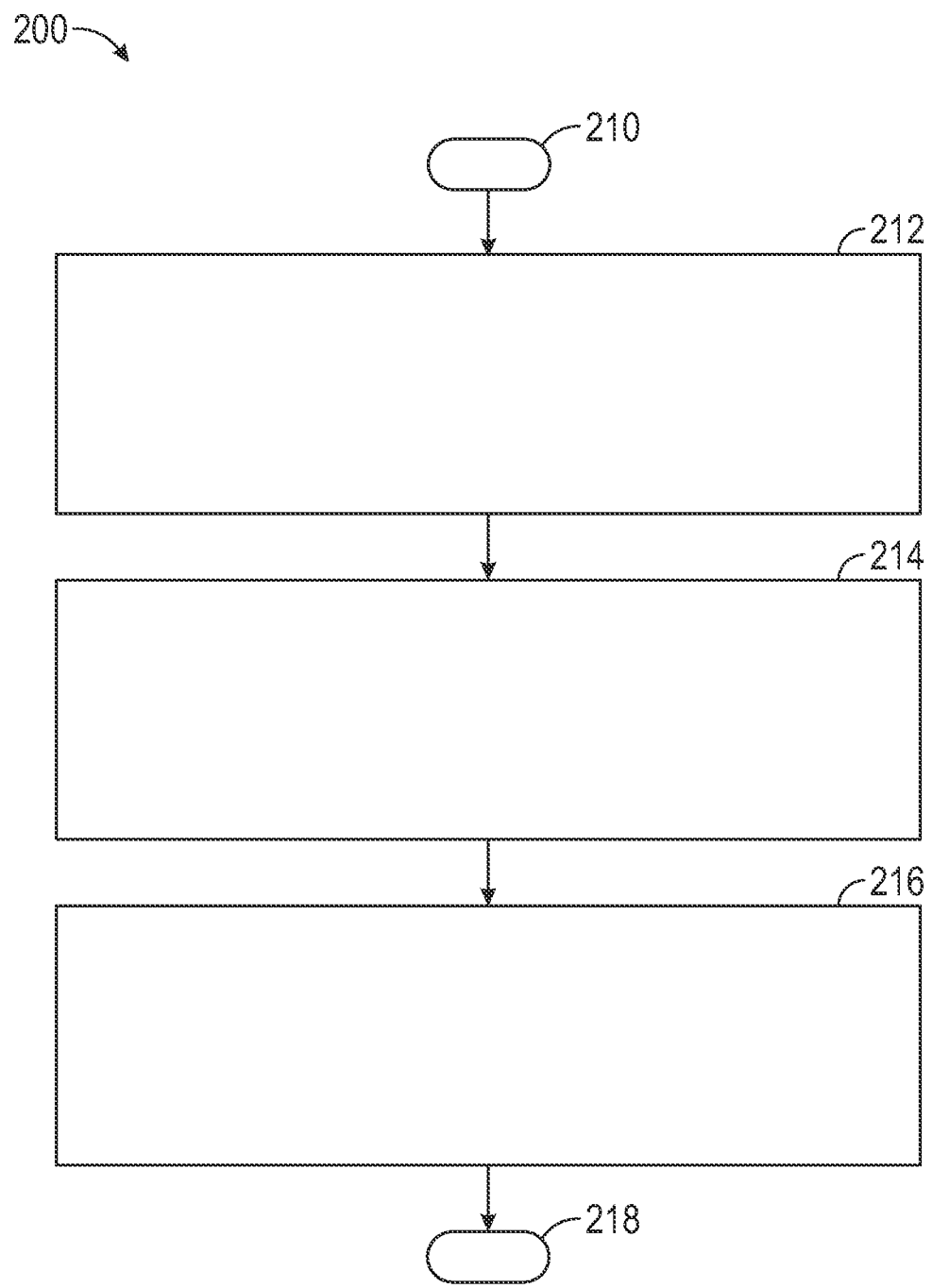
FIG. 12 is a flowchart illustrating certain steps of a method for transitioning a vehicle from an autonomous driving mode to a manual driving mode that includes deployment of a manual driving apparatus in accordance with an example.

With reference now to FIG. 12 and with continued reference to FIGS. 1-11, a flowchart provides an exemplary method 200 for switching operation of the vehicle 10 from the autonomous operating mode to the manual operating mode as performed by the vehicle driving system 100. As may be appreciated in light of the disclosure, the order of operation within the method 200 is not limited to the sequential execution as illustrated in FIG. 12, but may be performed in one or more varying orders as applicable and in accordance with the present disclosure. In various embodiments, certain steps of the method 200 may be executed and/or initiated by one or more processors associated with the vehicle 10 (e.g., the processor(s) 44).

In one example, the method 200 may start at 210. In various examples, the method 200 may be scheduled to run based on one or more predetermined events, such as in response to the controller 34 receiving a command to switch to the manual operating mode. At 212, the method 200 may include transitioning the screen 52 within the vehicle 10 from the closed configuration to the open configuration by moving the screen to uncover the opening to the compartment of the vehicle 10 and provide access to the compartment via the opening. At 214, the method 200 may include transitioning the manual driving apparatus 24 of the vehicle 10 from the concealed configuration to the exposed configuration by moving the manual driving apparatus 24 from within the compartment to at least partially outside of the compartment. At 216, the method 200 may include transitioning the vehicle 10 from the autonomous operating mode wherein the automated driving system 50 performs driving tasks of the vehicle 10 without human intervention to the manual operating mode wherein at least some of the driving tasks are performed based on human interaction with the manual driving apparatus 24. The method 200 may end at 218.

The systems and methods disclosed herein provide various benefits over certain existing systems and methods. For example, the capability to deploy and stow the manual driving apparatus 24 provides for manual operation while in the manual driving mode and extra space for promoting comfort while in the autonomous driving mode. Further, the capability of adjusting the position of the manual driving apparatus 24 provides for additional options for the seating arrangements within the vehicle 10. For example, the vehicle 10 may be configured to transition between a two-seat arrangement with extra space for the occupants, and a four-seat arrangement for accommodating additional occupants.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A system for a vehicle, comprising:
a screen within the vehicle configured to selectively transition between a closed configuration and an open configuration by moving the screen, wherein the screen covers an opening to a compartment of the vehicle while in the closed configuration and allows for access to the compartment via the opening while in the open configuration;
a manual driving apparatus including a steering wheel system, an accelerator pedal, and a brake pedal configured to selectively transition between a concealed configuration and an exposed configuration by moving the manual driving apparatus toward a rear of the vehicle, wherein the manual driving apparatus is disposed within the compartment and behind the screen while in the concealed configuration and disposed at least partially outside of the compartment when in the exposed configuration; and
a controller configured to, by one or more processors, transition the vehicle between an autonomous operating mode and a manual operating mode, wherein while in the autonomous operating mode the manual driving apparatus is in the concealed configuration and an automated driving system is configured to perform driving tasks of the vehicle without human intervention, wherein while in the manual operating mode the manual driving apparatus is in the exposed configuration and the vehicle is configured to perform at least some of the driving tasks based on human interaction with the manual driving apparatus.

2. The system of claim 1, wherein at least the steering wheel system is configured to transition between a collapsed configuration and an expanded configuration when the manual driving apparatus is transitioned between the concealed configuration and the exposed configuration, wherein the manual driving apparatus occupies a reduced cubic volume while the steering wheel system is in the collapsed configuration relative to the expanded configuration.

3. The system of claim 1, further comprising a carriage supporting the manual driving apparatus, a track on which the carriage is configured to slide into and from the compartment between a front and a rear of the vehicle.

4. The system of claim 1, further comprising an instrument screen secured to a floor of the vehicle that is configured to display information indicative of the operation of the vehicle and an instrument screen located on a center console of the vehicle.

5. The system of claim 1, wherein the screen covers an area of the vehicle extending from a first side of the vehicle to a second side of the vehicle and extending from a floor of the vehicle to a base of a windshield of the vehicle.

6. The system of claim 1, further comprising a seat arrangement within the vehicle configured to selectively transition between a two-seat configuration and a four-seat configuration by sliding one or more front seats in directions between a front and a rear of the vehicle and one or more rear seats configured to deploy to occupy space provided while the one or more front seats are disposed toward the front of the vehicle, wherein the controller is configured to, by the one or more processors, determine a position of the manual driving apparatus in the exposed configuration based on the seat arrangement when transitioning the vehicle to the manual operating mode.

7. The system of claim 1, wherein the screen is configured to transition into the closed configuration while the manual driving apparatus is in the exposed configuration.

8. A method for selectively providing manual driving capabilities to an operator of a vehicle, comprising:
transitioning a screen within the vehicle from a closed configuration to an open configuration by moving the screen to uncover an opening to a compartment of the vehicle and provide access to the compartment via the opening;
transitioning a manual driving apparatus of the vehicle including a steering wheel system, an accelerator pedal, and a brake pedal from a concealed configuration to an exposed configuration by moving the manual driving apparatus toward a rear of the vehicle from within the compartment and behind the screen to at least partially outside of the compartment; and
transitioning, by a controller with one or more processors, the vehicle from an autonomous operating mode wherein while in the autonomous operating mode the manual driving apparatus is in the concealed configuration and an automated driving system performs driving tasks of the vehicle without human intervention to a manual operating mode wherein while in the manual operating mode the manual driving apparatus is in the exposed configuration and at least some of the driving tasks are performed based on human interaction with the manual driving apparatus wherein while in the autonomous operating mode the manual driving apparatus is in the concealed configuration.

9. The method of claim 8, wherein the method includes performing at least some of the driving tasks using the steering wheel system, the accelerator pedal, and the brake pedal while the vehicle is in the manual operating mode.

10. The method of claim 9, further comprising transitioning at least the steering wheel system from a collapsed configuration to an expanded configuration while transitioning the manual driving apparatus from the concealed configuration to the exposed configuration, wherein the manual driving apparatus occupies a reduced cubic volume while the steering wheel system is in the collapsed configuration relative to the expanded configuration.

11. The method of claim 8, wherein transitioning the manual driving apparatus from the concealed configuration to the exposed configuration includes sliding a carriage supporting the manual driving apparatus on a track from the compartment toward a rear of the vehicle.

12. The method of claim 8, further comprising displaying information indicative of the operation of the vehicle on an instrument panel secured to a floor of the vehicle.

13. The method of claim 8, further comprising interacting with an instrument panel located on a center console of the vehicle.

14. The method of claim 8, further comprising, prior to transitioning the manual driving apparatus from the concealed configuration to the exposed configuration:
transitioning a seat arrangement within the vehicle from a two-seat configuration to a four-seat configuration by sliding one or more front seats in a direction toward a front of the vehicle and deploying one or more rear seats to occupy space provided by sliding the one or more front seats;
receiving, by the controller, an operator initiated command to transition to the manual operating mode; and determining, by the controller, a position of the manual driving apparatus in the exposed configuration based on the seat arrangement.

15. The method of claim 8, further comprising covering the opening of the compartment while the manual driving apparatus in the exposed configuration by transitioning the screen from the open configuration to the closed configuration.

16. A vehicle, comprising:
- a screen within the vehicle configured to selectively transition between a closed configuration and an open configuration by moving the screen, wherein the screen covers an opening to a compartment of the vehicle while in the closed configuration and allows for access to the compartment via the opening while in the open configuration;
- a manual driving apparatus including a steering wheel system, and accelerator pedal, and a brake pedal configured to selectively transition between a concealed configuration and an exposed configuration by moving the manual driving apparatus toward a rear of the vehicle, wherein the manual driving apparatus is disposed within the compartment and behind the screen while in the concealed configuration and disposed at least partially outside of the compartment when in the exposed configuration; and
- a controller configured to, one or more processors, transition the vehicle between an autonomous operating mode and a manual operating mode, wherein while in the autonomous operating mode the manual driving apparatus is in the concealed configuration and an automated driving system is configured to perform driving tasks of the vehicle without human intervention, wherein while in the manual operating mode the manual driving apparatus is in the exposed configuration and the vehicle is configured to perform at least some of the driving tasks based on human interaction with the manual driving apparatus.

17. The vehicle of claim 16, wherein at least the steering wheel system is configured to transition between a collapsed configuration and an expanded configuration when the manual driving apparatus is transitioned between the concealed configuration and the exposed configuration, wherein the manual driving apparatus occupies a reduced cubic volume while the steering wheel system is in the collapsed configuration relative to the expanded configuration.

18. The vehicle of claim 16, further comprising a carriage supporting the manual driving apparatus, a track on which the carriage is configured to slide into and from the compartment between a front and a rear of the vehicle.

19. The vehicle of claim 16, further comprising a seat arrangement within the vehicle configured to selectively transition between a two-seat configuration and a four-seat configuration by sliding one or more front seats in directions between a front and a rear of the vehicle and one or more rear seats configured to deploy to occupy space provided while the one or more front seats are disposed toward the front of the vehicle, wherein the controller is configured to, by the one or more processors, determine a position of the manual driving apparatus in the exposed configuration based on the seat arrangement when transitioning the vehicle to the manual operating mode.

* * * * *